(12) United States Patent
Gallant

(10) Patent No.: US 7,477,575 B2
(45) Date of Patent: Jan. 13, 2009

(54) REDUNDANT TIMER SYSTEM AND METHOD

(75) Inventor: John Gallant, Plano, TX (US)

(73) Assignee: Verisign, Inc., Mountain View, CA (US)

( * ) Notice: Subject to any disclaimer, the term of this patent is extended or adjusted under 35 U.S.C. 154(b) by 246 days.

(21) Appl. No.: 11/233,058

(22) Filed: Sep. 23, 2005

(65) Prior Publication Data

US 2007/0070820 A1    Mar. 29, 2007

(51) Int. Cl.
*G04F 8/00* (2006.01)
*G06F 1/04* (2006.01)
(52) U.S. Cl. .................. 368/108; 368/46
(58) Field of Classification Search ........... 379/13; 714/55; 368/46, 108
See application file for complete search history.

(56) References Cited

U.S. PATENT DOCUMENTS

| | | | | |
|---|---|---|---|---|
| 5,848,028 A | * | 12/1998 | Burklin | 368/46 |
| 5,978,939 A | * | 11/1999 | Mizoguchi et al. | 714/55 |
| 6,516,422 B1 | * | 2/2003 | Doblar et al. | 713/503 |
| 6,658,579 B1 | * | 12/2003 | Bell et al. | 713/400 |
| 6,675,307 B1 | * | 1/2004 | Heitkamp et al. | 713/401 |

* cited by examiner

*Primary Examiner*—Renee S Luebke
*Assistant Examiner*—Jason Collins
(74) *Attorney, Agent, or Firm*—Townsend and Townsend and Crew LLP

(57) ABSTRACT

A scalable system and method for redundant timing. A clock $CT_0$ is set to count a time $T_0$. One more time increments $e_i$ are defined for other clocks $CT_i$, each to count a times $T_i = T_{i-1} + e_j$. After the earliest time that a timer $CT_j$ completes counting its time, an event E is caused to occur and an event F is caused to occur with regard to at least one of the timers $CT_k$, k being an integer from j+1 to N.

22 Claims, 3 Drawing Sheets

REDUNDANT TIMER SYSTEM AND METHOD

FIELD OF THE INVENTION

The field of the invention is timing, in particular the establishment and operation of redundant backup timers.

BACKGROUND OF THE INVENTION

Reliable timing is an essential component of many applications. Prepaid telephone systems use timing to enforce call length. Authentication systems may use timers to ensure that authentication is completed within a fixed time or may require a user to re-authenticate after a certain amount of time has passed. Application servers may use timers to provide redundant services, accessing backup resources once a timeout has been reached.

All of these applications may fail if the timer relied on fails. Typically, applications that use timers use a single timer. Should that timer fail the application will not perform correctly. In the prepaid telephone system example given above, this may mean that hours worth of free telephone calls are made. With no timer to trigger the disconnect of a call, switches may leave the call active for well beyond the amount of time purchased. Similarly, security may suffer if a timer fails. An application that requires a user to re-authenticate after a certain time may allow access well past that time, increasing the chance that the trusted user has walked away and been replaced by an unauthorized user. A timer failure may result in lost profits or user dissatisfaction if an application fails to access alternative resources because it is not notified that it has waited too long for the primary resource.

Given that timing failures may result in great expense, weakened security, user dissatisfaction, lost profits, and other serious problems, it is essential to provide failure resistant timing. What is needed is a scalable method of employing multiple timers. Multiple timers would add needed redundancy and would protect against timer failures.

DETAILED DESCRIPTION

In accordance with an embodiment of the present invention, multiple timers may be employed to ensure reliable timing for time-sensitive applications. An application may need to count a time a time $T_0$. To do so, the application may set a number of timers. The first timer $CT_0$ may be configured to count the time T. A number of backup timers, CTi, may then each be configured to count a time $T_i = T_{i-1} + e_i$, where none, some or all of the time increments $e_i$ may be equal to each other. If the timer $CT_0$ counts down its time successfully, it can cause a prescribed event (e.g., start an application, stop an application, send a message, cause a message to be sent, etc.) and can cause a message to be sent to the rest of the timers to stop counting. If, on the other hand, timer $CT_0$ is incapacitated for some reason or it cannot cause the prescribed event, then the next timer $CT_1$ can cause the prescribed event and send one or more messages to the rest of the timers. Likewise, if that timer is also incapacitated, then timer $CT_2$ can perform these functions. In this way, the successive timers act as backups to earlier timers.

The magnitude time intervals $e_i$ may be defined to satisfy the requirements of any particular implementation and should be made large enough to account for the time required to notify other timers that a timer has completed counting its time. For example, if in a particular configuration it takes 100 ms to notify $CT_2$ that timer $CT_1$ has completed timing, then $e_2$ may be set to 110 ms or some other time designed to account for the delay between completion and notification. The magnitude of $e_i$ should be relatively small compared to the time period being counted, preferably at least an order of magnitude smaller.

When a timer successfully counts its time T, the timer may cause an event by any suitable means, including sending a message (e.g., to an application), causing a message to be sent or executing a set of instructions itself. It can also "turn off" the rest of the timers, e.g., stop the counting of the other timers, stop the other timers from performing a prescribed action upon expiry of their count times, etc. This may be accomplished by sending the other timers a "stop counting" message, a message that causes the other timers to be terminated (e.g., as executing applications, threads or processes), a message that causes the other timers to not perform a prescribed event at the expiry of their respective time countings, etc., by causing such a message to be sent. Alternatively, a timer that successfully counts its time may cause actions taken by the other timers to cause a given effect at the expiry of their respective times to be ignored, e.g., by instructing an application to ignore messages from the other timers.

Figure 1:
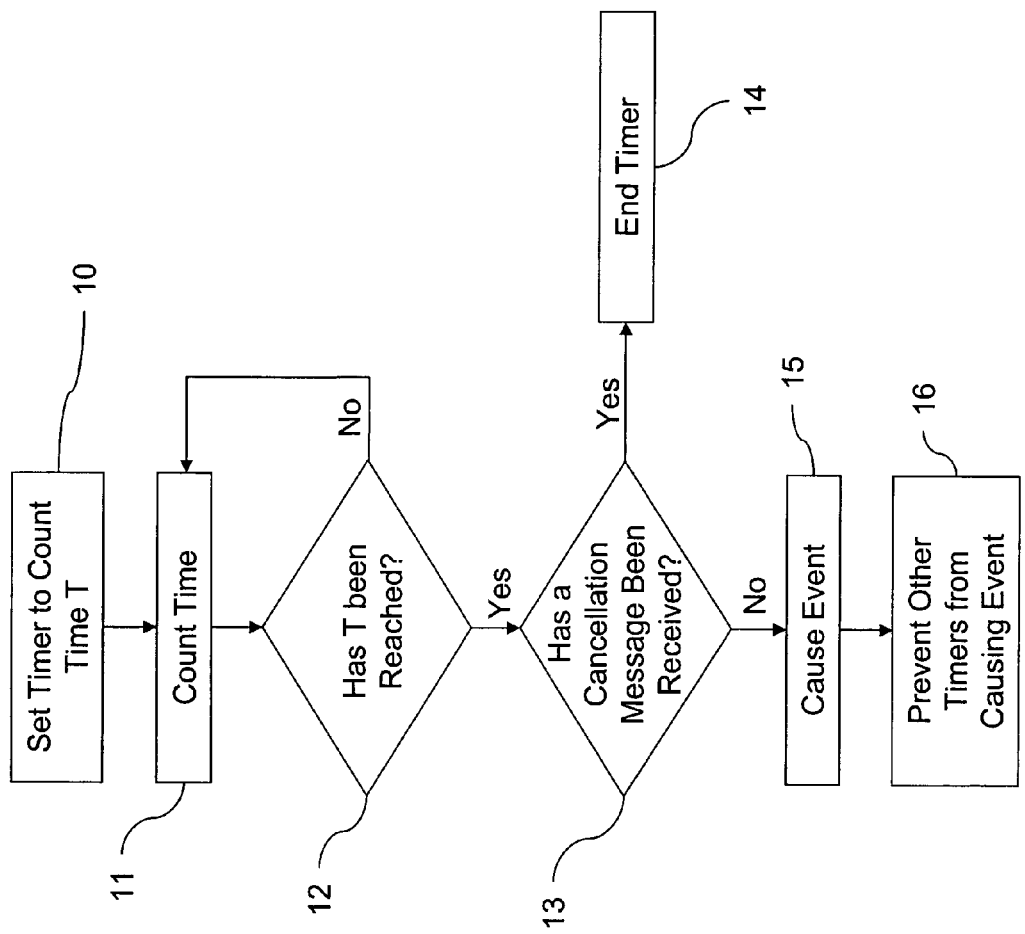
FIG. 1 is a flow chart of an embodiment of the present invention.

FIG. 1 shows a flowchart of an individual timer in accordance with an embodiment of the present invention. An application requiring timing services may set such a timer as well as any number of other such timers, 10. Once a timer is set it begins counting a time, T, which may be specified by the setting application, 11. The timer may count time until it reaches the time specified, 12. Once counting is complete the timer may check to see if it has received a message indicating that another timer has already completed counting, 13. If it has received such a message, the timer may stop without taking further action, 14. If the timer has not received such a message, it may cause an event to occur, 15. The timer may then prevent other timers from causing events, possibly by sending them a message or through some other means, 16.

The redundant backup timers in accordance with the present invention can be used in a wide range of useful applications. The following examples are meant to illustrate, but not to limit, the scope of the claimed invention.

Prepaid Telephone Call Timing

Figure 2:
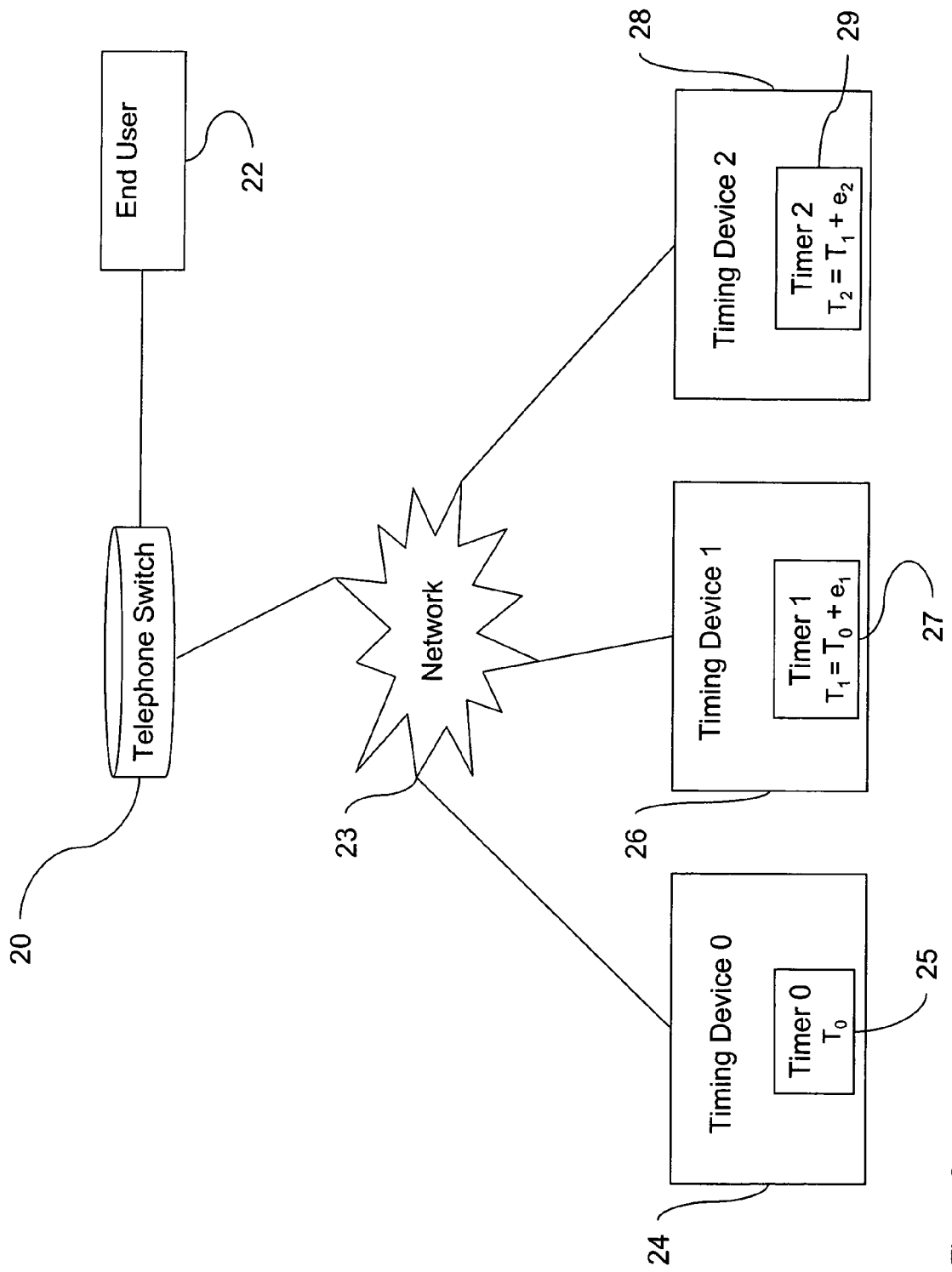
FIG. 2 is a diagram of a prepaid telephone system employing the present invention.

In accordance with an embodiment of the present invention, redundant timers may be employed to ensure reliable timing of prepaid telephone calls, as depicted in FIG. 2. A telecommunication carrier's telephone switch, 20, may set up and manage telephone calls. Users may place calls for a time equal to the amount of time they have purchased, 22. The switch, 20, may then allow calls for up to the purchased time by establishing a timer for each such call. If the time counted by the call timer expires before the caller hangs up, then switch 20 can terminate the call. Otherwise, telecommunications services may be provided to the caller with no compensation to the carrier.

In some cases, the timer could fail. For example, the timer could freeze at a given time count, the switch could fail to receive a message from the timer that the counted time has expired, etc. In this case, the switch may permit the call to continue long after it should be terminated, based upon the funds available in the caller's prepaid account.

In accordance with an embodiment of the present invention, the switch (or any suitable component of the system) may set a number of timers, 25, 27, 29. These timers may be implemented on the switch (e.g., as different threads of the same process, as separate running applications, etc.) or on one or more other hardware devices, 24, 26, 28. The hardware devices 24, 25 and 26 can be coupled to the switch 20 through any suitable network 23. The first timer, 25, may be configured to count the amount of time the user has purchased. Each of the other timers may be configured to count a time larger than the timer before it by some time increment e. These time increments may be selected to account for the time required to notify a timer that another timer has completed, including network latency, 23, processing time, and other factors. In another embodiment, at least one timer is on the switch and at least one other is on a separate hardware device.

When the first timer to count its time completes, it may cause the switch to terminate the call, e.g., by send a message to the switch, 20, notifying it that the call has reached its limit and should be disconnected. The switch may then disconnect the call. The timer may also send messages to the other timers preventing them from sending a message to the switch.

The present invention can be used in connection with any telecommunications event (e.g., telephone call, transmission of messages, etc.) For example, when the timers are meant to time a telecommunications event, the expiry of a time T can cause a billing record to be generated for a call, cause the call to be interrupted, cause the call to be forwarded to an Interactive Voice Response (IVR) system to give the caller the opportunity to add funds to a prepaid account, etc.

Authentication

Figure 3:
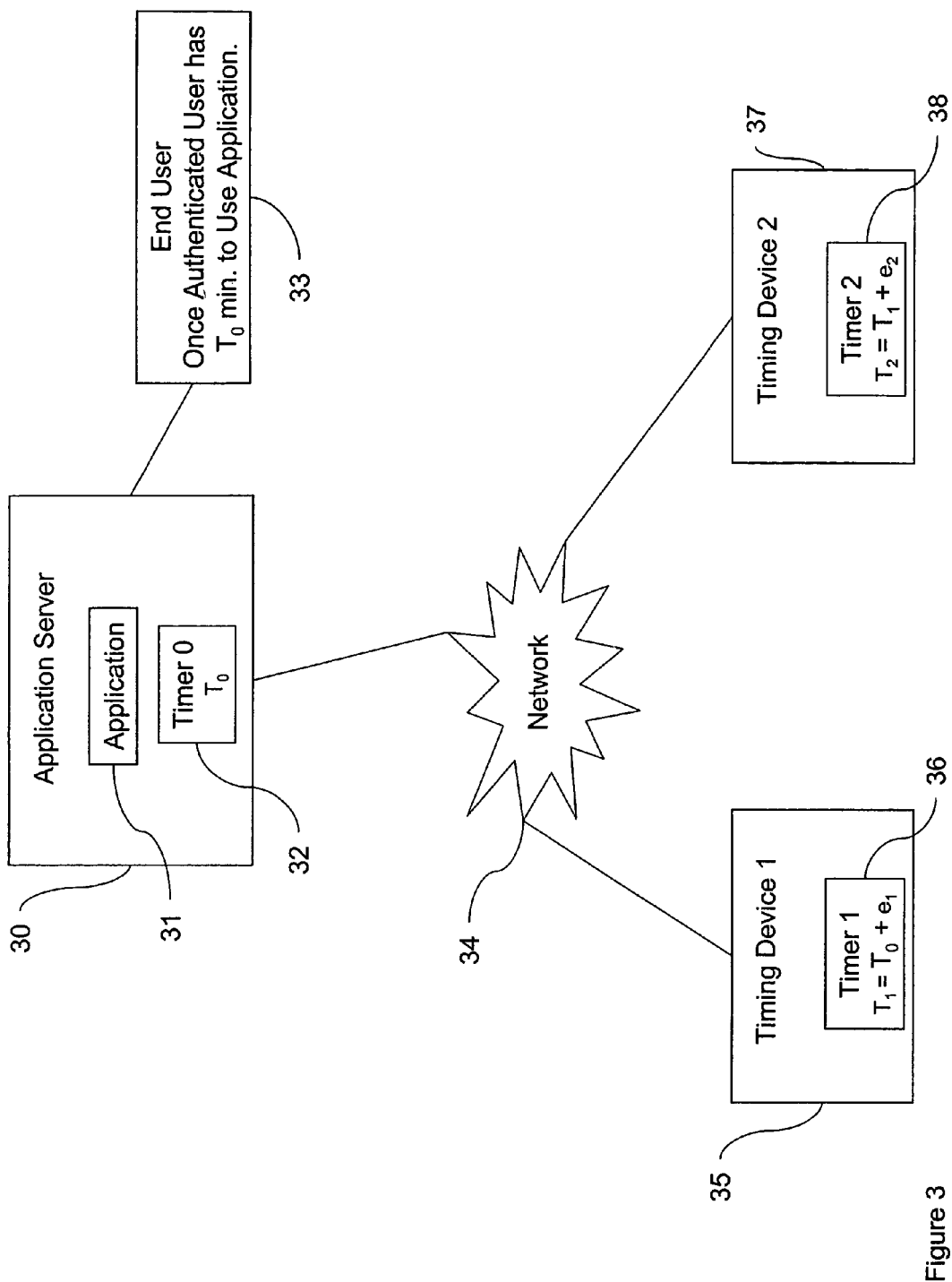
FIG. 3 is a diagram of a system using the present invention to enforce an authentication scheme.

In accordance with another embodiment of the present invention, backup timing may be used to enforce application timeouts (e.g., to strengthen authentication, to conserve computing resources, etc.) as depicted in FIG. 3. End user 33 attempting to access an application 31 may be required to authenticate himself, using passwords, tokens, or other means of authentication. To ensure that a user does not remain authenticated indefinitely, application 31 may set a time limit after which users must authenticate again or it may set a time period of inactivity after which authentication is required, or in some other suitable way enforce an authentication policy through a timeout.

Application 31 may then set a number of timers 32, 35 and 38 to count the relevant time. The timers 33, 35 and 38 may be implemented using the application server 30 or they may be distributed across any number of other hardware devices, 30, 35 and 37, or both. The timers 32, 35 and 38 may be set at the time of authentication or after the occurrence of some event, such as a predetermined time of user inactivity. The first timer, 32, may be configured to count the time that the user has remaining before the timeout is to be enforced. Each additional timer 35 and 38 may be configured to count more time than the timer before it by some time increment or increments. The timers 35 and 38 may each be configured with an $e_i$ selected to account for the time required to notify a timer that another has completed, including network latency processing time, and other factors.

Once a timer has completed counting its time, it may notify application 31, which can take any appropriate action, such as returning to a previous state, shutting out the user, resetting data posted to an online form, etc. Once the completed timer notifies application 31 that it has completed counting, it may also prevent the other timers from notifying application 31 should they complete counting, e.g., by sending a message to the other timers, by sending a message to the application (which may then either ignore subsequent reports from the other clocks or itself send the timer cancellation messages), etc.

A timer may include a processor coupled to a memory, where the memory stores a set of timer instructions adapted to be executed by the processor. The processor can be an Application Specific Integrated Circuit (ASIC) that embodies at least part of the method of the present invention in its hardware and firmware. An example of an ASIC is a signal processor. Alternatively, the processor can be a general purpose multiprocessor, such as the Intel Pentium IV. Memory can be any device suitable for storing electronic information, such as a hard disk, RAM, ROM, flash memory, a CD, etc.

Memory can store timer instructions adapted to be executed by the processor to perform at least a part of the method in accordance with an embodiment of the present invention. For example, timer instructions can be executed on the processor to define one or more time increments $e_i$, i an integer from 1 to N and set a timer $CT_0$ to count a time $T_0$. Additional timers $CT_i$ can be set to count times $T_i = T_{i-1} + e_i$.

After the earliest time that a timer $CT_j$ completes counting its time, j being an integer from 0 to N, an event E can be caused. For example, a message can be sent to a recipient indicating that timer $CT_j$ has completed counting its time $T_j$; an active telephone call can be terminated (e.g., the expired time can represent the depletion of a prepaid account balance); an application can be caused to timeout; a program, process or thread can be caused to be initiated; etc.

Also, an event F can be caused with regard to at least one later timer, i.e., a timer in the group of timers $CT_k$, k being an integer from j+1 to N. For example, one, several or all such later timers can be caused to be turned off, e.g., by sending or causing to be sent a cancelation message to such timers. Similarly, an application can be caused to ignore messages from such later timers, e.g., indicating that their respective times $T_k$ have expired.

Memory may be distributed separately and apart from any operating system of timers, i.e., as software for establishing such a system. Such software may be distributed, for example, on CD, or be downloadable from memory coupled through a processor to a network.

The system of timers in accordance with an embodiment of the present invention forms a useful system for effectuating events meant to occur at the expiry of a given time.

The embodiments discussed above are not exhaustive of the possible embodiments of the present invention. They serve only to illustrate possible uses of the present invention. Any application that requires timing may benefit from the present invention which provides a scalable and redundant timing architecture.

What is claimed is:

1. A method of backup timing comprising:
   a. defining one or more time increments $e_i$, i an integer from 1 to N;
   b. setting a timer $CT_0$ to count a time $T_0$, wherein setting the timer $CT_0$ is in response to an initiation of an application running on a device external to the timer $CT_0$;
   c. setting one or more timers $CT_i$, i the integer from 1 to N, to count a time $T_i = T_{i-1} + e_i$;
   d. after the earliest time that a timer $CT_j$ completes counting its time, j being an integer from 0 to N,
      i. causing an event E that includes causing the application to change an operational state; and ii. causing an event F with regard to at least one timer in a group of timers $CT_k$, k being an integer from j+1 to N.

2. The method of claim 1, wherein the application is associated with an active telephone call, and wherein event E includes causing a termination of the active telephone call.

3. The method of claim 1, wherein event E includes causing the application to timeout.

4. The method of claim 1, wherein event F includes preventing at least one timer in the group of timers $CT_k$, k being an integer from j+1 to N, from completing a corresponding count $T_k$.

5. The method of claim 1, wherein event F includes sending to at least one timer in the group of timers $CT_k$, k being an integer from j+1 to N, a message canceling said at least one timer.

6. The method of claim 1 wherein event F includes causing an application program to ignore a message from at least one timer in the group of timers $CT_k$, k being an integer from j+1 to N, said message being indicative that said at least one timer has completed counting a corresponding time $T_k$.

7. The method of claim 1, wherein event E includes causing a message, indicating that a time Tj has expired, to be sent to the device external to the timer $CT_0$.

8. The method of claim 1, wherein the device external to the timer $CT_0$ includes a computer processor, and wherein event E includes initiating an execution of a set of instructions on the computer processor.

9. The method of claim 1, wherein the event E includes causing a creation of a billing record for a telecommunications event.

10. The method of claim 1, wherein event E includes causing a modification of a prepaid telecommunications services account balance.

11. The method of claim 1, wherein the application is initiated by a remote user.

12. The method of claim 1, wherein the change in an operational state is a termination of the application.

13. A system including N+1 timers, wherein N is an integer, the system comprising:
    a timer $CT_0$ that is set to count a time $T_0$, wherein the timer $CT_0$ is set in response to an initiation of an application running on a device external to the timer $CT_0$;
    N timers $CT_i$ that are set to count times $T_i = T_{i-1} + e_i$, where i is an integer from 1 to N and $e_i$ are time increments;
    at least one hardware device, wherein after an earliest time that a timer $CT_j$ completes counting its time, j being an integer from 0 to N, the hardware device causes:
        an event E that includes causing the application to change an operational state; and
        an event F with regard to at least one timer in a group of timers $CT_k$, k being an integer from j+1 to N.

14. The system of claim 13, wherein event F includes preventing at lease one timer in the group of timers $CT_k$, k being an integer from j+1 to N, from completing a corresponding count $T_k$.

15. The system of claim 13, wherein event F includes causing an application program to ignore a message from at least one timer in the group of timers $CT_k$, k being an integer from j+1 to N, said message being indicative that said at least one timer has completed counting its time $T_k$.

16. The system of claim 13, wherein event L includes causing a message to be sent indicating that a time Tj has expired.

17. The system of claim 13, wherein the application is associated with an active telephone call, and wherein event E includes causing a termination of the active telephone call.

18. The system of claim 13 wherein event E includes causing the application to timeout.

19. The system of claim 13, wherein the device external to the timer $CT_0$ includes a computer processor, and wherein event E includes initiating an execution of a set of instructions on the computer processor.

20. A medium storing instructions adapted to be executed on a processor to perform steps including:
    a. defining one or more time increments $e_i$, i an integer from 1 to N;
    b. setting a timer $CT_0$ to count a time $T_0$, wherein setting the timer $CT_0$ is in response to an initiation of an application running on a device external to the timer $CT_0$;
    c. setting one or more timers $CT_i$, i the integer from 1 to N, to count a time $T_i = T_{i-1} + e_i$;
    d. after an earliest time that a timer $CT_j$ completes counting its time, j being an integer from 0 to N,
        i. causing an event E that includes causing the application to change an operational state; and
        ii. causing an event F with regard to at least one timer in a group of timers $CT_k$, k being an integer from j+1 to N.

21. The medium of claim 20, wherein event E is causing a message to be sent indicating that a time Tj has expired.

22. The medium of claim 20, wherein event F includes sending to at least one timer in the group of timers $CT_k$, k being an integer from J+1 to N, a message canceling said at least one timer.

* * * * *